(12) United States Patent
Lindström et al.

(10) Patent No.: US 9,751,955 B2
(45) Date of Patent: Sep. 5, 2017

(54) REGENERATION OF CELLULOSE

(71) Applicant: RE:NEWCELL AB, Stockholm (SE)

(72) Inventors: Mikael Lindström, Lidingö (SE); Gunnar Henriksson, Solna (SE)

(73) Assignee: RE:NEWCELL AB, Stockholm (SE)

( * ) Notice: Subject to any disclaimer, the term of this patent is extended or adjusted under 35 U.S.C. 154(b) by 45 days.

(21) Appl. No.: 14/450,362

(22) Filed: Aug. 4, 2014

(65) Prior Publication Data

US 2014/0343270 A1 Nov. 20, 2014

Related U.S. Application Data

(63) Continuation of application No. PCT/EP2013/053260, filed on Feb. 19, 2013.

(30) Foreign Application Priority Data

Feb. 20, 2012 (SE) .................. 1250142

(51) Int. Cl.
| | | |
|---|---|---|
| *C08B 16/00* | (2006.01) | |
| *D01F 2/08* | (2006.01) | |
| *D01F 2/02* | (2006.01) | |
| *D21C 5/00* | (2006.01) | |
| *D01F 2/00* | (2006.01) | |
| *D01F 2/06* | (2006.01) | |
| *D01D 1/02* | (2006.01) | |

(52) U.S. Cl.
CPC .............. *C08B 16/00* (2013.01); *D01D 1/02* (2013.01); *D01F 2/00* (2013.01); *D01F 2/06* (2013.01); *D21C 5/00* (2013.01)

(58) Field of Classification Search
CPC .............. C08B 16/00; D01F 2/08; D01F 2/02
USPC .......................................... 536/57
See application file for complete search history.

(56) References Cited

U.S. PATENT DOCUMENTS

| | | | | |
|---|---|---|---|---|
| 4,004,967 A * | 1/1977 | Swan | .................... | D21C 9/1036 162/65 |
| 4,145,532 A | 3/1979 | Franks et al. | | |
| 7,674,608 B2 * | 3/2010 | Varanasi | ................. | C12P 19/14 435/96 |
| 2008/0023162 A1 * | 1/2008 | Myllymaki | .............. | C08H 6/00 162/163 |
| 2013/0177948 A1 * | 7/2013 | Nakamura | .............. | C12P 19/02 435/99 |

FOREIGN PATENT DOCUMENTS

| | | |
|---|---|---|
| GB | 588 751 A | 6/1947 |
| GB | 750 100 A | 6/1956 |
| WO | WO 2012/039462 A1 | 3/2012 |

* cited by examiner

*Primary Examiner* — Patrick Lewis
*Assistant Examiner* — Everett White
(74) *Attorney, Agent, or Firm* — Renner, Otto, Boisselle & Sklar, LLP

(57) ABSTRACT

A method for regeneration of a cellulose containing material, comprises the steps: a) exposing the cellulose containing material to oxygen with an alkali aqueous solution at a pH of at least 9, and a temperature of at least 20° C., b) dispersing the cellulose containing material in the alkali aqueous solution, wherein the temperature of the alkali aqueous solution is lowered below 15° C., and wherein the pH of the alkali aqueous solution is above 9, c) adding an organic solvent to the dispersion to precipitate cellulose, and d) separating the precipitated cellulose by at least one method selected from filtering and centrifugation. The method makes it possible to maintain a high alkali pH value in the process, which saves costs since the pH value does not have to be lowered by additions of various additives. The method makes it possible to remove non-cellulose parts of the cloth.

16 Claims, 1 Drawing Sheet

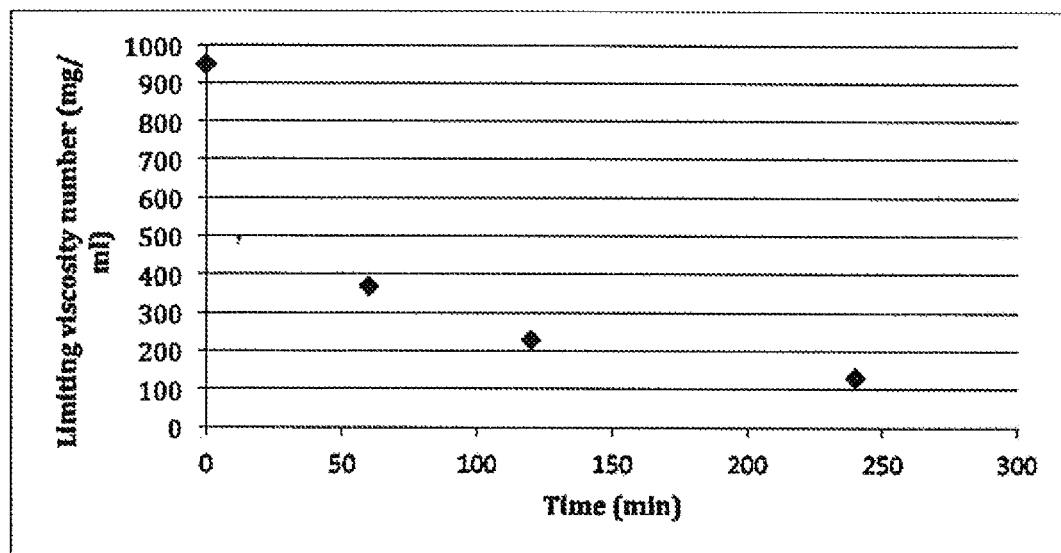

REGENERATION OF CELLULOSE

This application is a continuation of PCT Application No. PCT/EP2013/053260 filed on 19 Feb. 2013, the disclosure of which is incorporated herein by reference in its entirety.

TECHNICAL FIELD

The present invention relates to a process useful when recycling cellulose.

BACKGROUND

Cellulose is an important constituent in plants and comprises anhydrous glucose units. Cellulose is utilized for making synthetic fibers for instance by spinning a yarn or a thread. Recycled cellulose can be regenerated and used for spinning yarn, thread, fibers etc.

There are several known ways to dissolve cellulose for various applications including manufacture regenerated cellulosic fiber. Often expensive chemicals are used in such processes. (Ohno H and Fukaya Y (2009) Task specific ionic liquids for cellulose technology Chemistry Letters V38)

Zhao et al, in Biotechnology and Bioengineering, pp. 1320-1328, Vol. 99, No. 6, 2008 discloses treatment of wood fiber bundles with NaOH and NaOH/Urea. There is disclosed treatment with cold NaOH. The treated pulp is neutralized. Any cellulose which is dissolved in the NaOH solution is apparently not used further. It is disclosed that treatment with cold NaOH is advantageous. The yield is improved with pretreatment.

WO 20101124944 discloses a process for the hydrolysis of cellulose comprising the sequential steps: a) mixing cellulose with a viscosity below 900 ml/g with an aqueous solution to obtain a liquid, wherein particles comprising cellulose in said liquid have a diameter of maximum 200 nm, wherein the temperature of the aqueous solution is below 35° C., and wherein the pH of the aqueous solution is above 12, b) subjecting the liquid to at least one of the steps: i) decreasing the pH of the liquid with at least 1 pH unit, ii) increasing the temperature by at least 20° C., and c) hydrolyzing the cellulose.

A. Isogai et al in Cellulose, vol 5, pp 309-319, 1998 discloses a method of dissolving cellulose in NaOH and then freezing the liquid.

A problem in the prior art is that when making a synthetic cellulose fiber from cellulose by for example a spinning process it may result in a mechanical weak fiber. This is particularly a problem when using recycled cellulose. Often the mechanical strength of the cellulose fiber is not satisfactory.

Another problem is that during some processes the pH value is changed for instance from high to low, which will add to the cost of the process.

Another problem when recycling cotton clothes is that some parts, which do not comprise cellulose, have to be removed. Examples include but are not limited to seams, buttons, fibers not based on cellulose and so forth.

There is a need for an improved process for regenerating cellulose, in particular when using recycled cellulose as a raw material for new cellulose fibers.

SUMMARY

It is an object of the present invention to obviate at least some of the disadvantages in the prior art and to provide an improved process for the regeneration of cellulose containing materials.

In a first aspect there is provided a method for regeneration of a cellulose containing material, said method comprising the sequential steps:
a) exposing the cellulose containing material to oxygen or a gas mixture comprising oxygen together with an alkali aqueous solution at a pH of at least 9, and a temperature of at least 20° C.,
b) dispersing the cellulose containing material in the alkali aqueous solution to obtain a dispersion, wherein the temperature of the alkali aqueous solution is lowered below 15° C., and wherein the pH of the alkali aqueous solution is above 9,
c) adding at least one organic solvent to the dispersion to precipitate cellulose, and
d) separating the precipitated cellulose from the remaining liquid by at least one method selected from filtering and centrifugation.

Further aspects and embodiments are defined in the appended claims, which are specifically incorporated herein by reference.

Advantages include that the mechanical strength of fibers and yarn spun from cellulose increases when this regeneration method is used.

The method makes it possible to maintain a high alkali pH value in the process, which saves costs since the pH value does not have to be lowered by additions of various additives.

The method makes it possible to remove various components of the cloth, which components do not comprise cellulose.

BRIEF DESCRIPTION OF THE DRAWINGS

The invention is now described, by way of example, with reference to the accompanying drawings, in which:

FIG. 1 shows the limiting viscosity number as a function of time. The experiment is described in detail in example 1.

DETAILED DESCRIPTION

Before the invention is disclosed and described in detail, it is to be understood that this invention is not limited to particular compounds, configurations, method steps, substrates, and materials disclosed herein as such compounds, configurations, method steps, substrates, and materials may vary somewhat. It is also to be understood that the terminology employed herein is used for the purpose of describing particular embodiments only and is not intended to be limiting since the scope of the present invention is limited only by the appended claims and equivalents thereof.

It must be noted that, as used in this specification and the appended claims, the singular forms "a", "an" and "the" include plural referents unless the context clearly dictates otherwise.

If nothing else is defined, any terms and scientific terminology used herein are intended to have the meanings commonly understood by those of skill in the art to which this invention pertains.

"Encapsulation" is used herein in connection with cellulose to denote encapsulation of cellulose in a fiber which may occur for instance during mercerizing of cotton yarn.

"Solution" is used herein to denote a homogeneous mixture comprising at least one substance dissolved in a solvent.

"Dispersion" is used herein to denote a matter where regions of one component is embedded in a matrix of a second component. One example is cellulose particles in an alkali aqueous medium. A component in a dispersion can exist both as particles in a second component as well as in a solution in the second component. Thus a part of the cellulose can be present in an aqueous solution and another part of the cellulose can be present as particles in the aqueous solution. This mixture of a solution and a dispersion is still referred to as a dispersion. Thus dispersing can mean to simultaneous dissolve some cellulose in an alkali aqueous medium and at the same time to disperse remaining solid particles of cellulose in an alkali aqueous medium.

In a first aspect there is provided a method for regeneration of a cellulose containing material, said method comprising the sequential steps:
a) exposing the cellulose containing material to oxygen or a gas mixture comprising oxygen together with an alkali aqueous solution at a pH of at least 9, and a temperature of at least 20° C.,
b) dispersing the cellulose containing material in the alkali aqueous solution to obtain a dispersion, wherein the temperature of the alkali aqueous solution is lowered below 15° C., and wherein the pH of the alkali aqueous solution is above 9,
c) adding at least one organic solvent to the dispersion to precipitate cellulose, and
d) separating the precipitated cellulose from the remaining liquid by at least one method selected from filtering and centrifugation.

In step b) a part of the cellulose will dissolve in the alkali aqueous solution, and essentially all of the remaining part will be dispersed as fine particles in step b).

The cellulose containing material is typically mixed with an alkali solution and treated at an elevated temperature with oxygen.

In one embodiment the content of oxygen in the gas mixture is at least 20% by volume. Thus air can be utilized as gas mixture. In an alternative embodiment essentially pure oxygen is used. Also gas mixtures with an oxygen content between 20 and 100% by volume can be utilized.

In one embodiment the cellulose containing material is cloth.

In one alternative embodiment the pH is higher than 10 in step a) and b). In one embodiment the pH is at least 11 in step a) and b). In an alternative embodiment the pH is at least 12 in step a) and b).

In one embodiment the temperature in step a) is at least 30° C. In one embodiment the temperature in step a) is at least 40° C. In an alternative embodiment the temperature in step a) is at least 80° C. In an alternative embodiment the temperature in step a) is at least 90° C.

In one embodiment the exposure to oxygen or a gas mixture comprising oxygen in step a) is carried out at an atmospheric pressure. In an alternative embodiment the exposure to oxygen or a gas mixture comprising oxygen in step a) is carried at elevated pressure. In one embodiment the pressure of the gas or gas mixture is 0.6 MPa or higher during step a). An elevated pressure has the advantage of giving a shorter time for the process.

The cellulose containing material is dispersed in the alkali solution with stirring. In one embodiment vigorous stirring is used. In one embodiment a pump is used to create a turbulent flow which enhances mixing and dispersion of the cellulose containing material in the alkali aqueous solution.

In one embodiment the dispersion of the cellulose containing material in the alkali aqueous solution is subjected to filtration after step b). This has the advantage of removing matter which is not cellulose in recycled clothes. The non-cellulose material which is filtered away is optionally recovered and utilized for other suitable purposes. A filter used for this purpose should suitably allow most of any dispersed cellulose particles to pass, while retaining larger impurities. If most of the cellulose is dissolved and/or present as very small particles the filter can be finer and retain smaller impurities. In one embodiment a coarse metal filter is utilized.

In order for the solvent to be easily recyclable the solvent is in one embodiment miscible with water. A water miscible solvent is considered to be miscible with water at all relevant proportions at the relevant temperature without forming a two phase system. In order to facilitate the recycling the solvent has in one embodiment a boiling point which is lower than the boiling point of water. In one embodiment the solvent is miscible with water and has a boiling point which is lower than for water. In one embodiment the at least one organic solvent added in step c) is at least one selected from acetone, ethanol, isopropanol, and methanol.

In one embodiment the remaining liquid from step d) is separated into at least one stream comprising the at least one organic solvent, and at least one different stream comprising the alkali aqueous solution, wherein at least one of the streams are recycled, and wherein the separation is effected by at least one selected from a pressure lower than atmospheric pressure and a temperature higher than room temperature. In one embodiment the mixture of at least one organic solvent and the alkali aqueous solution is subjected to a vacuum and moderately elevated temperature in the interval 30-70° C. Thereby the at least one organic solvent will evaporate in gas phase and can be recovered by distillation. After this step the alkali solution is free or essentially free of organic solvent. In one embodiment the alkali solution is purified with ultra-filtration before it is used again. In one embodiment the alkali solution is treated with an absorbent before it is used again. In one embodiment the alkali solution is purified with ultra-filtration and treated with an absorbent before it is used again. In another embodiment the alkali aqueous solution is recovered by heating the material so that the water evaporates and recover the alkali substance, for instance NaOH. It is advantageous to recycle both the organic solvent and the alkali aqueous solution. The recycling of organic solvent and alkali will be both economical and a benefit for the environment since it drastically reduces emissions of for instance organic solvent.

The precipitated cellulose can in step d) be collected using any suitable filtering method. In one embodiment a cloth filter is utilized to collect the precipitated cellulose.

In one embodiment the separated precipitated cellulose from step d) is subjected to at least one selected from a pressure lower than atmospheric pressure and a temperature higher than room temperature to remove remaining at least one solvent and alkali liquid. In one embodiment the separated cellulose from step d) is subjected to a wash with water. After the separation of cellulose from the remaining liquid there may be small quantities of remaining organic solvent and alkali aqueous solution in the recovered cellulose depending on the efficiency of the filtration and/or centrifugation. These small amounts can be removed and recycled in the process. This will further reduce emissions from the process.

The alkali aqueous solution comprises hydroxide ions. In one embodiment the alkali aqueous solution comprises at least one metal hydroxide In one embodiment the alkali aqueous solution comprises at least one of NaOH, KOH and $Mg(OH)_2$. In one embodiment the alkali aqueous solution comprises at least 4 wt % of at least one of NaOH and KOH. In one embodiment the alkali aqueous solution comprises at least 6 wt % of at least one of NaOH and KOH. In one embodiment the alkali aqueous solution comprises at least 10 wt % of at least one of NaOH and KOH.

In one embodiment the temperature is below 10° C. in step b). In an alternative embodiment the temperature is below 4° C. in step b). In yet another embodiment the temperature is lowered below 0° C. in step b). In one embodiment the temperature is lowered to a temperature in the interval −3 to −8° C. in step b). The cooling is in one embodiment achieved with cooling by refrigerators. Alternatively a heat pump is utilized. Cooling can also at least partially be accomplished by cooling with cold water in a heat exchanger. Rapid cooling and/or cooling to low temperatures are accomplished with addition of frozen carbon dioxide and/or liquid nitrogen.

In one embodiment the separated precipitated cellulose from step d) is used as raw material for manufacture of regenerated cellulose. The regenerated cellulose can in turn be made into new cloth etc.

In one embodiment the separated precipitated cellulose from step d) is mixed with a solution of cellulose xanthate for manufacture of a regenerated fiber.

In another embodiment the separated precipitated cellulose from step d) is reacted with $CS_2$ to obtain cellulose xanthate for further manufacture of viscose.

In a second aspect there is provided a cellulose fiber manufactured with cellulose material manufactured according to any of the embodiments described above.

The raw material is a cellulose containing material. In one embodiment it is recycled cloth, where the cloth comprises cellulose; examples include but are not limited cotton or rayon. It is an advantage that the cloth can be blended i.e. that they comprise both synthetic material in addition to cellulose. Examples of such synthetic material include petroleum-based polymers.

It is also possible to use other raw materials with high cellulose content.

As an alternative there is provided a second method for regeneration of cellulose comprising the sequential steps:
a) dissolving cellulose containing material in an aqueous solution, wherein the temperature of the aqueous solution is below 20° C., and wherein the pH of the aqueous solution is above 9, and
b) subjecting the aqueous solution to microfiltration with a filter cut off from 0.1 µm to 45 µm.

In one embodiment of the second method a pre-treatment step is carried out before step a), said pretreatment step lowers the polymerization degree and decreases encapsulation of cellulose. The pre-treatment is desirable to perform for most cloth except certain materials such as rayon. For cotton pre-treatment is desirable. The cellulose containing material is pretreated in order to lower the polymerization degree of the cellulose and decrease the encapsulation of cellulose, which may be a result of mercerizing cotton yarn. In one embodiment of the second method the pre-treatment is made with at least one method selected from the group consisting of treatment with strong acid, mechanical treatment, treatment by radical generating chemicals, and treatment with ionizing radiation. In one alternative the cellulose containing material is ground. In a different alternative a radical generating system such as hydrogen peroxide is used. In one alternative the pre-treatment is made with treatment in at least one strong acid. In one alternative the pre-treatment is made with treatment in at least one of sulphuric acid and hydrochloric acid. In one alternative the pre-treatment is made with treatment in at least one of sulphuric acid, hydrochloric acid, hydrobromic acid, hydroiodic acid, and chloride acid. The treatment condition is suitably at 60-90° C. during 1-5 minutes for a strong acid, for instance 20-50 wt % sulphuric acid or stronger. In one alternative the pre-treatment is made with treatment in sulphuric acid in a concentration above 20 wt % and a temperature above 40° C.

In one embodiment of the second method the aqueous solution comprises hydroxide ions. In one embodiment of the second method the aqueous solution comprises at least one metal hydroxide In one embodiment the aqueous solution comprises at least one of NaOH, KOH and $Mg(OH)_2$. In one embodiment of the second method the aqueous solution comprises at least 6 wt % of at least one of NaOH and KOH.

In one embodiment of the second method the filter cut off is from 0.1 µm to 10 µm. In an alternative embodiment of the second method the filter cut off is from 0.1 µm to 5 µm. In yet another embodiment of the second method the filter cut off is from 0.2 to 1.0 µm.

In one embodiment of the second method the temperature is below 15° C. in step a). In another embodiment of the second method the temperature is below 10° C. in step a). In yet another embodiment of the second method the temperature is below 4° C. in step a).

In one embodiment of the second method the cellulose which has been filtered away in step b) is recycled to step a). Optionally the cellulose can be treated to decrease the particle size before it is recycled.

The cellulose which has been dissolved and filtered is utilized for making a new fiber. In one embodiment the resulting cellulose is mixed with a solution cellulose xanthate for manufacture of a regenerated fiber. In an alternative embodiment the resulting cellulose is reacted with $CS_2$ to obtain cellulose xanthate for further manufacture of viscose. In yet another embodiment cellulose is precipitated by lowering the pH and used for manufacturing fibers.

Surprisingly, and regarding the second method the inventors have found that the combination of dissolving the cellulose and filter the solution using a filter pore size >0.10 µm but lower than 45 µm improves the mechanical properties of the synthetic cellulose fiber.

An attractive solution for the continuous filtration of the cellulose solution is cross flow-filter which comprises a long tubular ceramic membrane element perforated with several channels in its length direction. The cellulose solution is transported into the channels and while flowing through the channels the filtrate passes through the porous membrane channel walls and flows in a radial direction from the inside to the outside of the channels.

Other features and uses of the invention and their associated advantages will be evident to a person skilled in the art upon reading this description and the appended examples.

It is to be understood that this invention is not limited to the particular embodiments shown here. The following examples are provided for illustrative purposes and are not intended to limit the scope of the invention since the scope of the present invention is limited only by the appended claims and equivalents thereof.

EXAMPLES

Example 1 Decrease of Viscosity Caused by Treatment by Oxygen in Alkali

Slides of white sheet made of pure cotton were incubated at 2% with 4% NaOH 70° C. at 0.6 MPa pure oxygen for varying time. Viscosity was measured and the value was more than halved within 50 min. See FIG. 1 for data.

Example 2 Oxygen Treatment and Dissolution of Cellulose

The textile sample was the same sheet as in example 1. Samples were oxygen treated as described in the table, and thereafter dispersed in a 10% (weight) NaOH solution in water at 2% cellulose concentration, at −4° C. during agitation for 24 h. Viscosity was measured of samples as well as how much cellulose that was dissolved. Results are shown in table 1.

TABLE 1

| Concentration of textile | | Condition of oxygen treatment | Viscosity after treatment [mg/ml] | Amounth dissolved in alkali (%) | Viscosity after dissolution [mg/ml] |
|---|---|---|---|---|---|
| 5% | 1M NaOH | 70 min, 100° C., 0.6 MPa Oxygen | 570 | 9 | 270 |
| ca 30% | | 90 min, 100° C., 0.6 MPa Oxygen | 350 | 88 | 200 |
| 5% | 4M NaOH | 70 min, 70° C., 0.6 MPa Oxygen | 400 | — | — |
| ca 30% | | 70 min, 70° C., 0.6 MPa Oxygen | 270 | — | — |

Example 3 Dispersion of Cloth Resulting in Samples with Higher Viscosity

The same white cloth was used. Sample was pretreated with oxygen and thereafter dissolved in alkali as described in table 2. Viscosity of the dissolved cellulose was in this case higher than in the previous example.

TABLE 2

| Conditions of oxygen treatment | Viscosity after oxygen treament. [mg/ml] | Conditions for Dissolution in alkali | Dissolved amount (%) | Viscosity after dissolution [mg/ml] |
|---|---|---|---|---|
| 1M NaOH, 50 min, 90° C., 0.6 MPa pure oxygen, ca 30% concentration of cloth. | 660 | 10% NaOH, 2% Cloth concentration Temperature −5 C. 48 h agitation. | 86 | 540 |

Example 4 Dissolution and Fractionation of Mixed Cloth

The sample was in this case old colored clothes that according to the information provided by the manufacturer contained 5% elastane. It was treated with oxygen and dissolved/dispersed as describe in table 3. Liquid with the dissolved/dispersed cellulose was filtered with a steel web and a fraction consisting of elastane fibers apparently free of cellulose was obtained.

TABLE 3

| Oxygen treatment | Dissolution i alkali, −5° C. | Viscosity dissolved material [mg/ml] |
|---|---|---|
| 1 M NaOH, 120 min, 100° C., 0.6 MPa oxygen, ca 30% concentration of cloth. | 10% NaOH, 2% Cloth concentration | 150 |

Example 5 Precipitation of Cellulose

Cellulose from cloth treated as in example 2 was precipitated as follows:
Adjustment of pH to 12.5 with sulphuric acid, acetic acid or carbonic acid.
Addition of 5% (Volume) of acetone, isopropanol, methanol, or ethanol respectively.
In all cases the yield was close to 100%.

Example 6 Manufacture of Regenerated Cellulose Using NMMO from Cloth

White sheet made of cotton were treated with oxygen under following conditions. 5% cloth was mixed with 4% NaOH and treated at 100° C. for 60 minutes with 0.6 MPa oxygen. The viscosity after this treatment was 280 mg/ml. The sample was agitated at 2% concentration in 10% NaOH at minus 5° C. for 24 h. Undissolved material and undispersed material was removed by filtration. The viscosity of the dispersion was 170 mg/ml. The material was precipitated with methanol, ethanol and isopropanol as in example 5. The precipitate could be dissolved in 50% NMMO (N-methyl morpholine), were water was evaporated until 10% cellulose, 80% NNMO, 10% water. Samples gave clear solutions. When injected in water after first being exposed, into air fibres were obtained. It worked for cellulose precipitated with all of the three organic solvents.

Example 7 Manufacture of Regenerated Cellulose Made by the Viscose Method

Cellulose from cloth was dissolved as in example 2. It was precipitated with sulphuric acid as in example 5. The precipitated cellulose was collected on a filter paper and washed with 18% NaOH. The cellulose was placed in a textile bag, and excel of liquid was pressed out. Thereafter the cellulose was mixed with $CS_2$ in mass proportions 1:4. The sample was incubated in room temperature for 16 h, and thereafter 10% NaOH was added so that the cellulose concentration was 9%. Sample was placed at 4° C. with sporadic agitation and produced a viscous solution (cellulose xanthate solution). When samples were injected in 3% sulphuric acid reprecipitated fibers were obtained.

Example 8 Dissolution of Viscose Samples

Viscose yarn from Svenska Rayon were directly dissolved in 10% NaOH at 2% concentration and at −5° C. A solution of practically 100% was obtained. The cellulose precipitated as in example 5 and cellulose xanthate could be made as in example 7.

The invention claimed is:
1. A method for regeneration of a cellulose containing material, said method comprising the sequential steps:

a) exposing the cellulose containing material to oxygen or a gas mixture comprising oxygen together with an alkali aqueous solution at a pH of at least 9, and a temperature of at least 20° C.,
b) dispersing the cellulose containing material in the alkali aqueous solution to obtain a dispersion, wherein the temperature of the alkali aqueous solution is further lowered below 15° C., and wherein the pH of the alkali aqueous solution is above 9,
c) adding at least one organic solvent to the dispersion to precipitate cellulose, and
d) separating the precipitated cellulose from the remaining liquid by at least one method selected from filtering and centrifugation.

2. The method according to claim 1, wherein the dispersion of the cellulose containing material in the alkali aqueous solution is subjected to filtration after step b).

3. The method according to claim 1, wherein the at least one organic solvent added in step c) is miscible with water and has a boiling point which is lower than the boiling point of water.

4. The method according to claim 1, wherein the at least one organic solvent added in step c) is at least one selected from acetone, ethanol, isopropanol, and methanol.

5. The method according to claim 1, wherein the remaining liquid from step d) is separated into at least one stream comprising the at least one organic solvent, and at least one different stream comprising the alkali aqueous solution, wherein at least one of the streams is recycled, and wherein the separation is effected by at least one selected from a pressure lower than atmospheric pressure and a temperature higher than room temperature.

6. The method according to claim 1, wherein the separated precipitated cellulose from step d) is subjected to at least one selected from a pressure lower than atmospheric pressure and a temperature higher than room temperature to remove remaining at least one of the organic solvent and the alkali aqueous solution.

7. The method according to claim 1, wherein the separated precipitated cellulose from step d) is subjected to a wash with water.

8. The method according to claim 1, wherein the cellulose containing material is cloth.

9. The method according to claim 1, wherein the alkali aqueous solution comprises at least one metal hydroxide.

10. The method according to claim 1, wherein the alkali aqueous solution comprises at least 4 wt % of at least one of NaOH and KOH.

11. The method according to claim 1, wherein the temperature is below 10° C. in step b).

12. The method according to claim 1, wherein the temperature is below 4° C. in step b).

13. The method according to claim 1, wherein the pressure during step a) is 0.6 MPa or higher.

14. The method according to claim 1, wherein the separated precipitated cellulose from step d) is used as raw material for manufacture of regenerated cellulose.

15. The method according to claim 1, wherein the separated precipitated cellulose from step d) is mixed with a solution of cellulose xanthate for manufacture of a regenerated fiber.

16. The method according to claim 1, wherein the separated precipitated cellulose from step d) is reacted with CS2 to obtain cellulose xanthate for further manufacture of viscose.

* * * * *